US009703621B2

(12) United States Patent
Yamada et al.

(10) Patent No.: US 9,703,621 B2
(45) Date of Patent: Jul. 11, 2017

(54) INFORMATION PROCESSING APPARATUS AND INFORMATION PROCESSING METHOD

(71) Applicant: FUJITSU LIMITED, Kawasaki-shi, Kanagawa (JP)

(72) Inventors: Masahiko Yamada, Zama (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 97 days.

(21) Appl. No.: 14/796,790

(22) Filed: Jul. 10, 2015

(65) Prior Publication Data
US 2016/0062811 A1 Mar. 3, 2016

(30) Foreign Application Priority Data

Aug. 28, 2014 (JP) .................................. 2014-173771

(51) Int. Cl.
*G11C 29/00* (2006.01)
*G06F 11/07* (2006.01)

(52) U.S. Cl.
CPC ...... *G06F 11/0751* (2013.01); *G06F 11/0709* (2013.01)

(58) Field of Classification Search
CPC ......................... G06F 11/0751; G06F 11/0709
See application file for complete search history.

(56) References Cited

U.S. PATENT DOCUMENTS

2009/0265137 A1* 10/2009 Iida .................... G06F 11/2294
702/183
2010/0325493 A1* 12/2010 Morimura ........... G06F 11/0709
714/39

FOREIGN PATENT DOCUMENTS

JP 11-282819 10/1999
JP 2000-132432 5/2000

* cited by examiner

*Primary Examiner* — Guy Lamarre
(74) *Attorney, Agent, or Firm* — Fujitsu Patent Center

(57) ABSTRACT

An information processing apparatus, includes a processor, and memory storing instructions for causing the processor to allocate a node in an information processing system including the information processing apparatus as an investigation node configured to perform an investigation of data stored in memory of a node of which an error is detected. The processor further instructs the investigation node to acquire data to be investigated from the node of which the error is detected, instructs the investigation node to perform an operation for determining whether a predetermined value in the acquired data is a normal value, and determines that a failure occurs in the node of which the error is detected when the predetermined value is not a normal value.

3 Claims, 11 Drawing Sheets

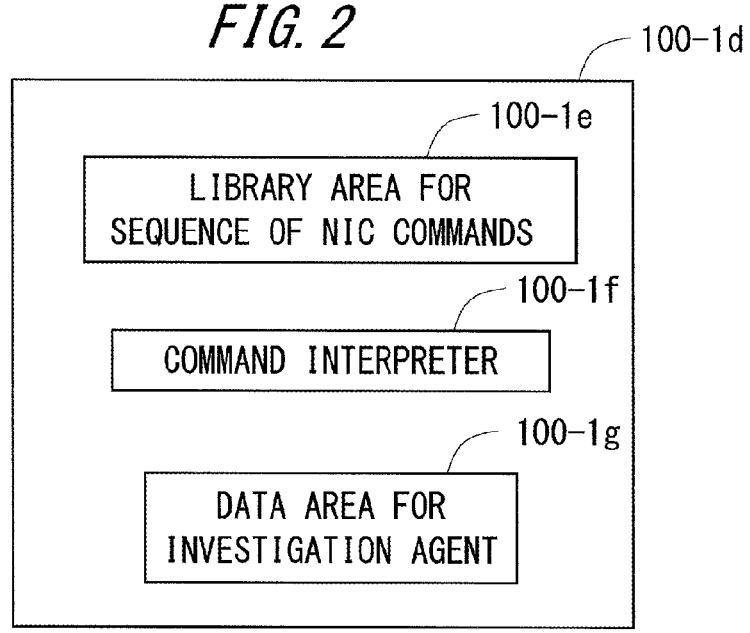
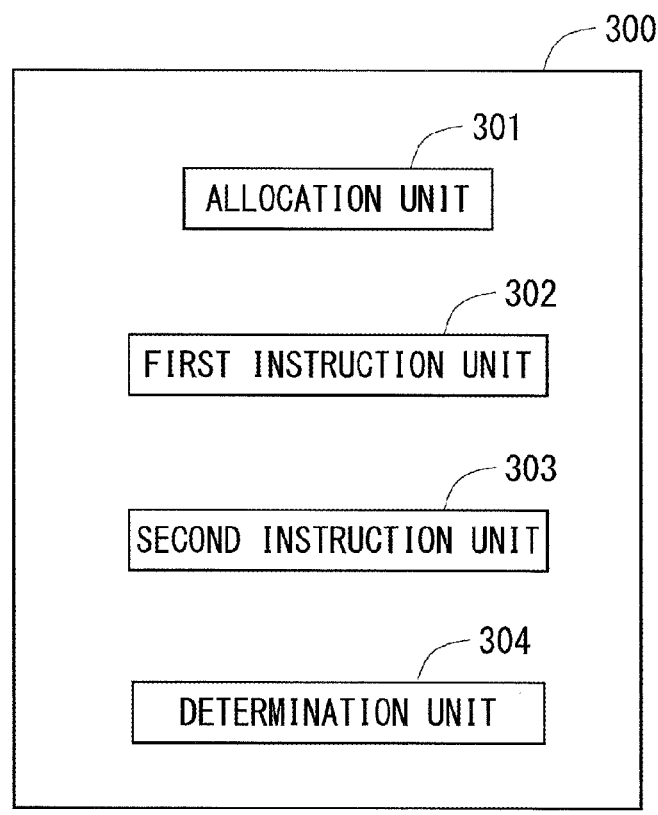

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2014-173771, filed on Aug. 28, 2014, the entire contents of which are incorporated herein by reference.

FIELD

The embodiments discussed herein are related to an information processing apparatus for parallel distributed processing and an information processing method therefor.

BACKGROUND

In a parallel distributed processing system as an example of an information processing system including a plurality of information processing apparatuses, hereinafter referred to as nodes, a tool for failure investigation is used to perform processes including acquisition of dump files and analysis of the acquired dump files. Therefore, data stored in memory of each node which is subject to the failure investigation in the system is transferred to a file server and stored as a dump file in the file server. And the analysis of the dump file and the output of the analysis result are performed after the storing of each dump file in the file server is completed.

The amount of data of dump files increases as the number of nodes from which dump files are acquired increases. Techniques for reducing the amount of memory dump in a parallel computer have been proposed (see patent documents 1 and 2 below).

The following patent document describes conventional techniques related to the techniques described herein.

PATENT DOCUMENT

[Patent document 1] Japanese Patent Application Laid-Open Publication No. 2000-132432
[Patent document 2] Japanese Patent Application Laid-Open Publication No. Hei11-282819

SUMMARY

According to one embodiment, it is provided an information processing apparatus, comprising a processor, and memory storing instructions for causing the processor to allocate a node in an information processing system including the information processing apparatus as an investigation node configured to perform an investigation of data stored in memory of a node of which an error is detected, instruct the investigation node to acquire data to be investigated from the node of which the error is detected, instruct the investigation node to perform an operation for determining whether a predetermined value in the acquired data is a normal value, and determine that a failure occurs in the node of which the error is detected when the predetermined value is not a normal value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 2 is a diagram schematically illustrating an investigation agent according to an embodiment;
FIG. 3 is a functional block diagram schematically illustrating a failure analyzing node according to an embodiment.

DESCRIPTION OF EMBIDOMENTS

Figure 1:
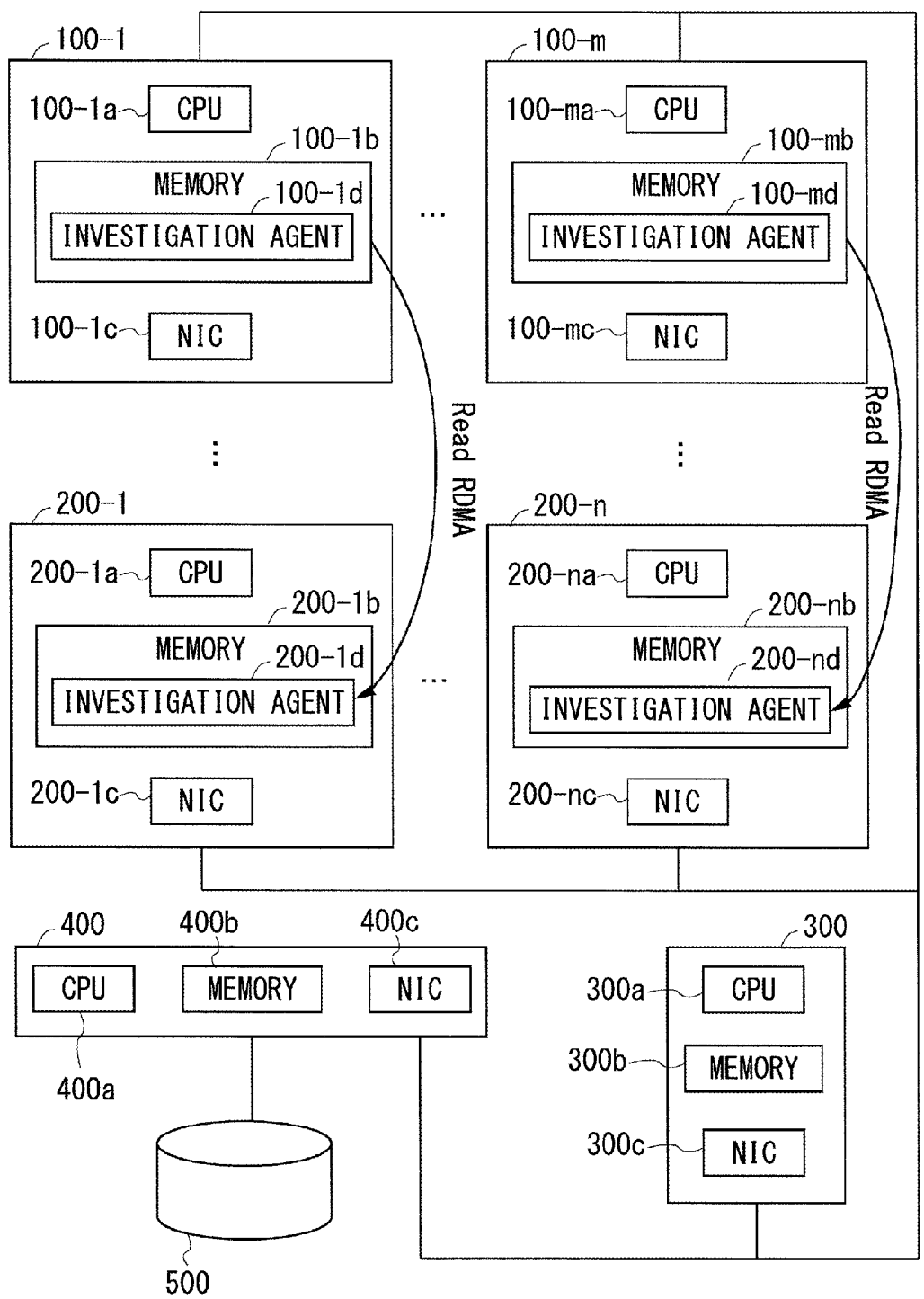
FIG. 1 is a diagram schematically illustrating a configuration of a parallel distributed processing system according to an embodiment.
Figure 4:
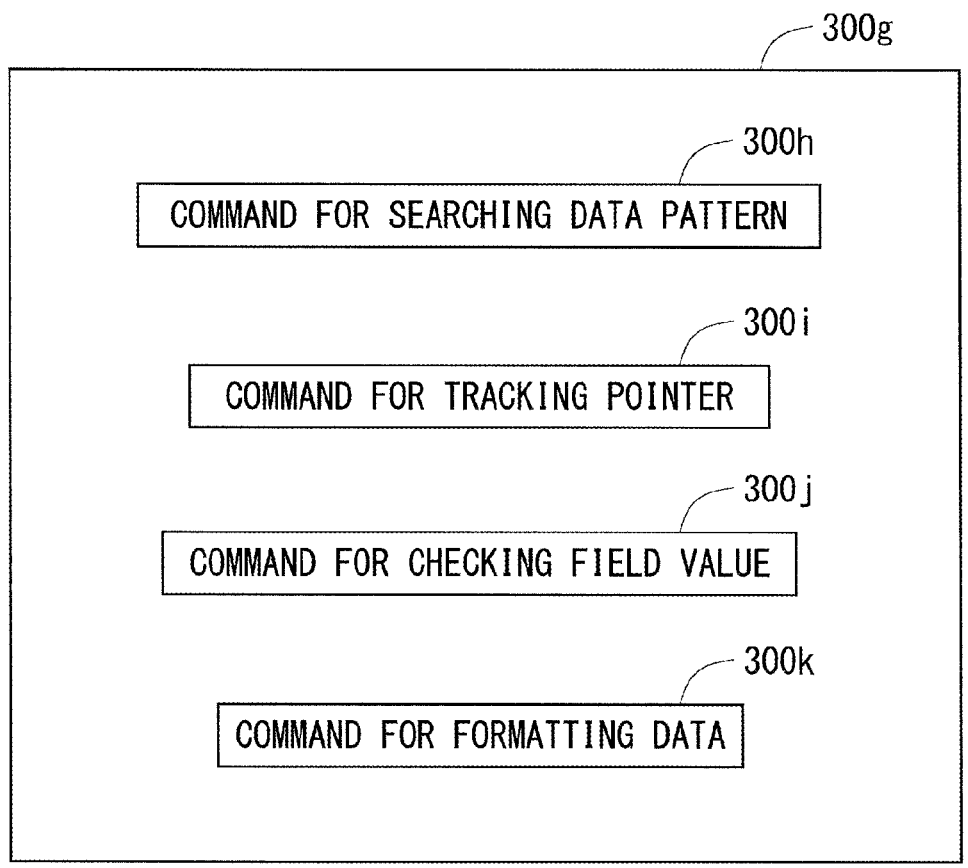
FIG. 4 is a diagram schematically illustrating a configuration of investigation commands according to an embodiment.

In the parallel distributed processing system, it is concerned that it will take time to perform processes for transferring dump files from nodes to the file server because of the number of nodes. In addition, it is also concerned that it will take time for the failure analyzing node to refer to the dump files stored in the file server to analyze the dump files because of the amount of data of the dump files. One aspect of the present invention lies in providing an information processing apparatus capable of shortening the time of performing failure investigations of nodes in an information processing system. First, a parallel distributed processing system according to one embodiment is described below with reference to the drawings. In the present embodiment, a parallel distributed processing system 1 as illustrated in FIG. 1 is described as an example. A configuration of the following embodiment is an exemplification, and the present apparatus is not limited to the configuration of the embodiment.

As illustrated in FIG. 1, m nodes (m is a natural number equal to or more than 2) 100-1 to 100-$m$ and n nodes (n is a natural number equal to or more than 2) 200-1 to 200-$n$ are connected with one another via a network 2 in the parallel distributed processing system in the present embodiment. Therefore, the nodes 100-1 to 100-*m* and 200-1 to 200-*n* can transfer data stored in their own nodes to the other nodes. The nodes 100-1 to 100-*m* and 200-1 to 200-*n* are connected with a failure analyzing node 300 and a file server 400. The failure analyzing node 300 and the file server 400 are connected with each other. In addition, the file server 400 is connected with a disk apparatus 500. It is noted that although one disk apparatus 500 is employed in the present embodiment, a plurality of disk apparatuses 500 can also be employed.

The node 100-1 includes a CPU 100-1*a*, memory 100-1*b* and a NIC (Network Interface Card) 100-1*c*. In addition, the memory 100-1*b* stores an investigation agent 100-1*d* as a daemon process of the OS (Operating System) executed in the node 100-1, for example. It is noted that the memory 100-1*b* corresponds to an example of a storage unit of anode. When the investigation agent 100-1*d* receives a command and an argument for investigating a node from the failure analyzing node 300, the investigation agent 100-1*d* performs analyzing processes according to the received command and argument. It is noted that the analyzing processes performed by the investigation agent 100-1*d* are described later.

The CPU 100-1*a* deploys and executes various applications stored in the memory 100-1*b*. Since the execution of applications by the CPU 100-1*a* is a conventional technique, the details of the execution are omitted here. The memory 100-1*b* stores information of the data structure in the kernel of the OS and information related to applications executed in the node 100-1. The NIC 100-1*c* is an extension card which communicates with the other nodes 100-m, 200-*n*, the failure analyzing node 300 and the file server 400.

As illustrated in FIG. 1, the nodes 100-*m*, 200-*n* also include CPUs 100-*ma*, 200-*na*, memory 100-*mb*, 200-*nb*, NICs 100-*mc*, 200-*nc* and investigation agents 100-*mc*, 200-*nd*, respectively. In addition, since the configurations of the CPUs, memory, NICs and investigation agents are similar to the configurations of the CPU 100-1*a*, memory 100-1*b*, NIC 100-1*c* and investigation agent 100-1*d*, the details of the configurations are omitted here.

The failure analyzing node 300 includes a CPU 300*a*, memory 300*b* and a NIC 300*c*. The CPU 300*a* deploys and executes applications stored in the memory 300*b* to perform processes related to the investigation of nodes as described below including reduction operations and data acquisitions in the parallel distributed processing system 1 as an example of an information processing system including nodes. The NIC 300*c* is an extension card which communicates with the nodes 100-*m*, 200-*n* and the file server 400.

The file server 400 includes a CPU 400*a*, memory 400*b* and a NIC 400*c*. The CPU 400*a* deploys and executes applications stored in the memory 400*b* to perform processes including acquiring dump files of the memory 100-1*b* to 100-*mb*, 200-1*b* to 200-*nb* from the nodes 100-1 to 100-*m*, 200-1 to 200-*n* and storing the acquired dump files in the disk apparatus 500. The NIC 400*c* is an extension card which communicates with the nodes 100-*m*, 200-*n* and the failure analyzing node 300.

As illustrated in FIG. 2, the investigation agent 100-1*d* includes a library area 100-1*e* for storing a sequence of NIC commands for controlling the NIC 100-1*c*. In addition, the investigation agent 100-1*d* includes a command interpreter 100-1*f* which interprets the commands which the node 100-1 receives from the failure analyzing node 300 and instructs the CPU 100-1*a* to perform processes determined by the received commands. Further, the investigation agent 100-1*d* includes a data area 100-1*g* for the investigation agent in which data acquired from the memory in the other nodes is stored. It is noted that the configurations of the investigation agents 100-*md*, 200-*nd* in the nodes 100-*m*, 200-*n* are similar to the configurations of the investigation agent 100-1*d*.

Furthermore, the CPU 300*a* of the failure analyzing node 300 deploys and executes programs stored in the memory 300*b* to function as an allocation unit 301, a first instruction unit 302, a second instruction unit 303 and a determination unit 304 as illustrated in FIG. 3. The allocation unit 301 allocates an investigation node for investigating data stored in the memory of the node of which an error is detected in the parallel distributed processing system 1. The first instruction unit 302 instructs the allocated investigation node to acquire data to be investigated from the node in which the error is detected. The second instruction unit 303 instructs the allocated investigation node to execute operations to determine whether a predetermined value in the acquired data is a normal value. The determination unit 304 determines that a failure occurs in the allocated investigation node when the predetermined value is not the normal value.

Moreover, the memory 300*b* stores investigation commands 300*g*. The investigation commands 300*g* include a command for searching a data pattern 300*h*, a command for tracking a pointer 300*i*, a command for checking a field value 300*j* and a command for formatting data 300*k*.

The command for searching a data patter 300*h* is a command for searching an instruction of investigating a specific data pattern in the data stored in the memory of the node to be investigated. The command for tracking a pointer 300*i* is a command for tracking a link relation related to a specific pointer in the data stored in the memory of the node to be investigated. The command for checking a field value 300*j* is a command for determining whether a specific filed value in the data stored in the memory of the node to be investigated is a predetermined value. The command for formatting data 300*k* is a command for formatting the data in the dump file of the node to be investigated which is stored in the disk apparatus 500 to be displayed by the failure analyzing node 300.

Figure 5:
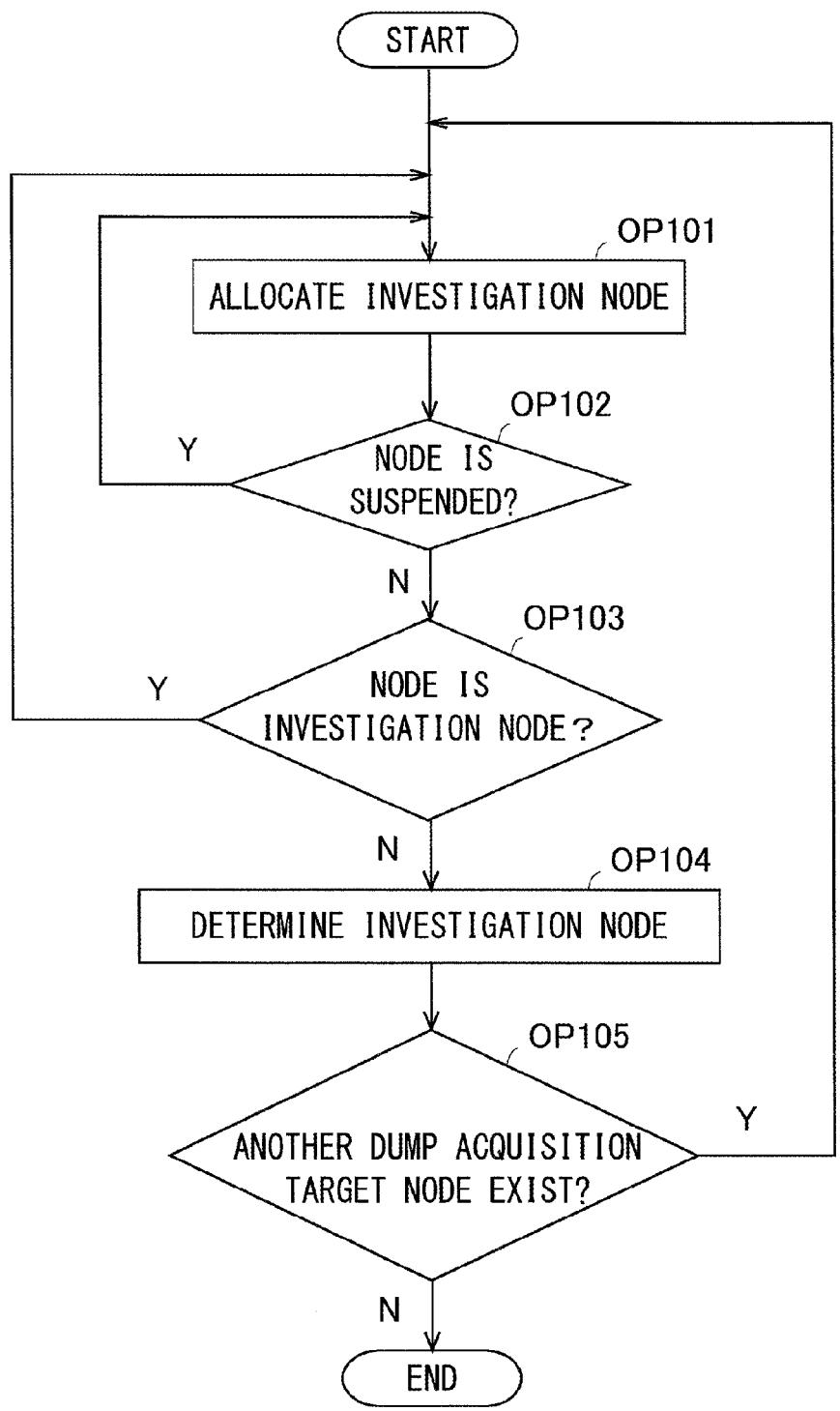
FIG. 5 is a flowchart of processes performed by a failure analyzing node according to an embodiment.

FIG. 5 illustrates a flowchart of processes performed by the failure analyzing node 300 in the present embodiment. In the present embodiment, when dump is acquired from a node in the parallel distributed processing system 1, the CPU 300*a* of the failure analyzing node 300 initiates the processes in the flowchart to the node from which a dump file is acquired. In the following descriptions, the failure analyzing node 300, for example, detects that errors occur in the node 100-1 and 100-*m* and dumps are acquired from the node 100-1 and 100-*m*. In OP101, the CPU 300*a* transmits a command to the node 100-1 for allocating the node 100-1 as an investigation node for its own node 100-1. It is noted here that the investigation node is a node which performs failure investigations of the node according to the various commands as described above received from the failure analyzing node 300.

In the flowchart in the present embodiment, the CPU 300*a* sets and refers to a flag for indicating that a specific command has been transmitted and a flag for indicating that a specific node has been allocated as an investigation node when the CPU 300*a* performs processes as described below. It is noted that any indicators other than the flags can be used as long as it can be determine that the specific command has been transmitted to the node and that the node has been allocated as an investigation node.

In OP101, the CPU 300*a* refers to the flag as described above to check that the command has not been transmitted to the node 100-1 and the node 100-1 is not specified as an investigation node. And the CPU 300a transmits a command to the node 100-1 to specify the node 100-1 as the investigation node. In addition, the CPU 300a sets the flag to indicate that the command has been transmitted to the node 100-1. Next, the CPU 300a proceeds with the process to OP102. In OP102, the CPU 300a determines whether the operation of the node 100-1 has been suspended based on whether the CPU 300a receives a response to the command transmitted to the node 100-1 in OP101. Specifically, the suspended node monitoring unit 300d determines whether the operation of each node in the parallel distributed processing system has been suspended.

In the following descriptions, it is assumed that the CPUs 100-1a, 100-ma of the nodes 100-1, 100-m do not respond to commands received from the outside of the nodes 100-1, 100-m, respectively. In addition, it is assumed that the nodes 200-1 to 200-n normally responds to commands received from the outside of the nodes 200-1 to 200-n, respectively. Such a situation occurs when a dynamic loop or an enabled wait state occurs at the kernel levels in the Operating Systems executed by the CPU 100-1a, 100-ma, for example. Therefore, the CPU 300a returns the process from OP102 to OP101 when the CPU 300a determines that the operations of the node 100-1 has been suspended (OP102: YEs) since the CPU 300a does not receive a response from the node 100-1.

When the process is returned from OP102 to OP101, the CPU 300a check the flag as described above to confirm that the command has been transmitted to the node 100-1 and the CPU 300a performs the process in OP101 to a node which is logically adjacent to the node 100-1. It is noted here that a node logically adjacent to a specific node corresponds, for example, to one of nodes in the node space of the parallel distributed processing system 1 for which the high-order bits except for the low-order bits of the offset of the node address, that is node ID, are the same as the high-order bits for the specific node.

In the present embodiment, it is assumed as an example that the node 200-1 is logically adjacent to the node 100-1. Therefore, the CPU 300a checks the flag as described above to confirm that the command has not been transmitted to the node 200-1 and the node 200-1 is not specified as an investigation node. And the CPU 300a transmits to the node 200-1 a command to allocate the node 200-1 for an investigation node to perform failure investigations of the node 100-1. Next, the CPU 300a proceeds with the process to OP102.

In the present embodiment, the node 200-1 responds to the command received from the CPU 300a. Therefore, in OP102 the CPU 300a receives the response from the node 200-1 and determine that the operation of the node 200-1 is not suspended (OP102: No) to proceed with the process to OP103. In OP103, the CPU 300a refers to the flag as described above in OP101 to determine whether the node 200-1 has been specified as an investigation node. It is noted here that the node 200-1 has not been specified as the investigation node. Therefore, the CPU 300a determines that the node 200-1 is not a node specified as the investigation node (OP103 : No) to proceed with the process to OP104.

In OP104, the CPU 300a specifies the node 200-1 as an investigation node for performing failure investigations of the node 100-1 and sets the flag to indicate that the node 200-1 is specified as the investigation node. Next, the CPU 300a proceeds with the process to OP105. In OP105, the CPU 300a determines whether there is another node in the parallel distributed processing system 1 from which a dump file is acquired. A dump file is also acquired from the node 100-m as described above in the present embodiment. Therefore, the CPU 300a performs the processes in OP101 to OP105 again to the node 100-m.

In the present embodiment, since the operation of the node 100-m is suspended similar to the node 100-1, the CPU 300a performs the processes as described above to specify the node 200-n, for example, logically adjacent to the node 100-m as an investigation node. Next, in OP105, when the CPU 300a determines that there is not a node in the parallel distributed processing system from which a dump file is acquired (OP105: No), the CPU 300a terminates the processes in the flowchart.

It is noted that when there is not a node the operation of which is not suspended and which is not specified as an investigation node unlike the above case of the nodes 100-1, 100-m as described above, the CPU 300a performs the processes in OP101, OP102, OP103 and OP104 in this order. And the CPU 300a specifies the node to be subject to the failure investigation as an investigation node. For example, when the node 100-2 is subject to the failure investigation and the CPU 300a determines in OP102 that the operation of the node 100-2 has not been suspended, the node 100-2 is specified as the investigation node.

Figure 6:
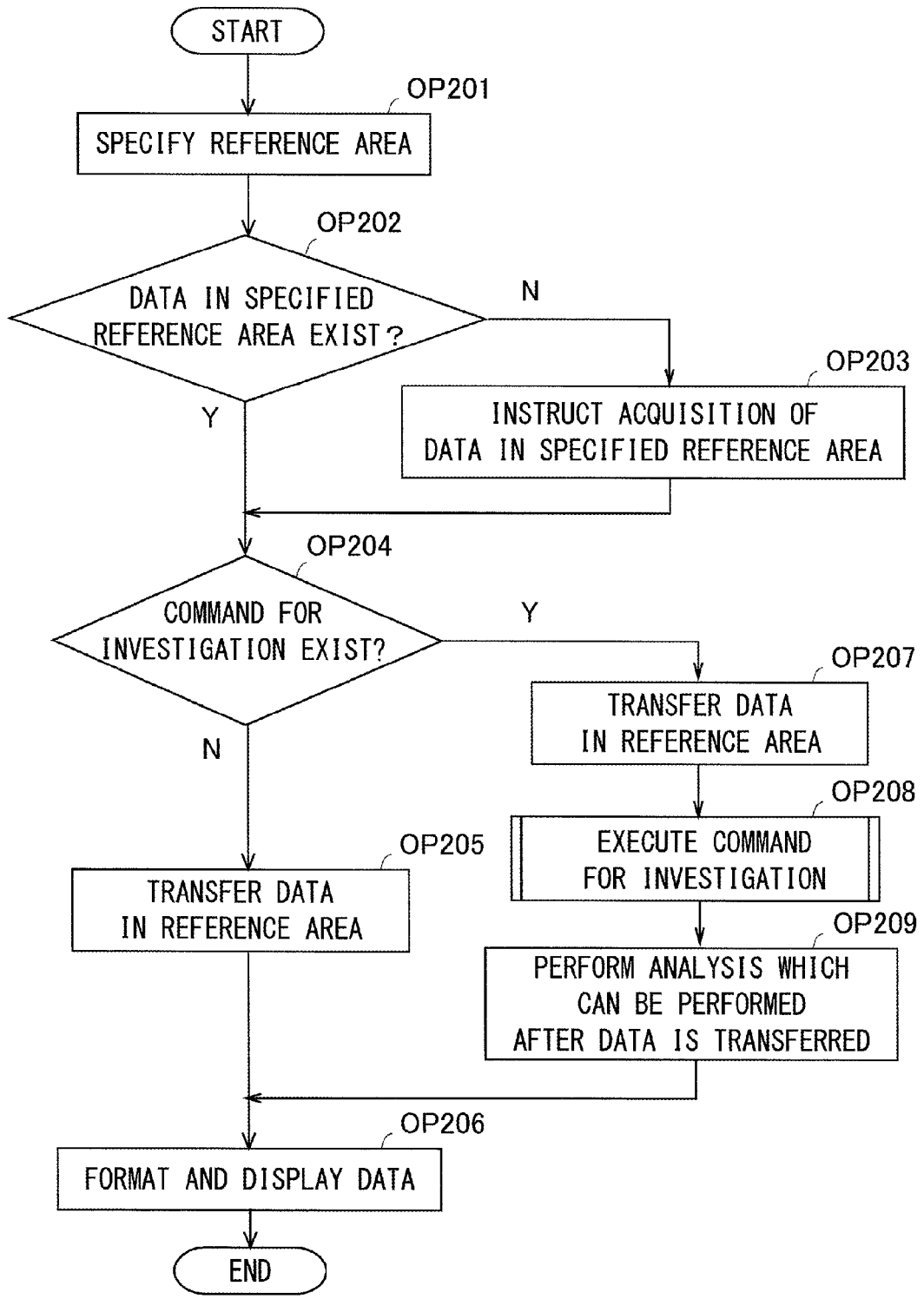
FIG. 6 is a flowchart of processes performed by a parallel distributed processing system according to an embodiment.

Next, the processes performed by the node specified as the investigation node in the present embodiment are described with reference to the flowchart in FIG. 6. The nodes 200-1, 200-n specified as the investigation nodes of the nodes 100-1, 100-m, respectively, performs the various failure investigation processes according to commands received from the failure analyzing node 300. FIG. 6 illustrates a flowchart of processes performed by the CPU 300a of the failure analyzing node 300. In the following descriptions, the processes performed by the CPU 300a to the node 200-1 are described. It is noted that the CPU 300a performs processes to the node 200-n similar to the case of the node 200-1.

In OP201, the CPU 300a transmits a command to the file server 400 to instruct the file server 400 to acquire from the disk apparatus 500 data in a predetermined reference area in the data acquired from the memory 100-1b of the node 100-1 and transfer the acquired data to the failure analyzing node 300. It is noted that the predetermined reference area is an area which includes data as the execution target of a command used for the failure investigation as described below. When the file server 400 receives the command from the CPU 300a, the file server 400 acquires data in the predetermined reference area from the disk apparatus 500 and transfers the acquired data to the failure analyzing node 300. When the file server 400 cannot acquire the data in the predetermined reference area from the disk apparatus 500, the file server 400 notifies the failure analyzing node 300 that the data as the acquisition target is not stored in the disk apparatus 500.

In OP202, the CPU 300a determines whether the CPU 300a receives from the file server 400 the data which the CPU 300a instructs the file server 400 to acquire. When the failure analyzing node 300 receives the data (OP202: Yes), the CPU 300a proceeds with the process to OP204. On the other hand, when the failure analyzing node 300 does not receive the data (OP202: No), the CPU 300a proceeds with the process to OP203.

In OP203, the CPU 300a transmits to the node 200-1 a command to instruct the node 200-1 to acquire the data in the predetermined area determined in OP201 from the memory 100-1b of the node 100-1. Next, the CPU 300a proceeds with the process to OP204. In OP204, the CPU 300a determines whether the commands for the failure investigation are stored in the memory 300b. In the present embodiment, the investigation commands 300g include a command for searching a data pattern 300h, a command for tracking a pointer 300i and a command for checking a field value 300j. Therefore, the CPU 300a determines in OP204 in the present embodiment that the commands for the failure investigation are stored in the memory 300b (OP204: Yes), the CPU 300a proceeds with the process to OP207. On the other hand, the CPU 300a determines that the commands for the failure investigation are not stored in the memory 300b (OP204: No), the CPU 300a proceeds with the process to OP205. In OP205, the CPU 300a transmits to the node 200-1, to which the command to acquire the data is transmitted in OP203, a command to instruct the node 200-1 to transfer the acquired data to the failure analyzing node 300.

Similar to OP205, the CPU 300a transmits in OP207 to the node 200-1, to which the command to acquire the data is transmitted in OP203, a command to instruct the node 200-1 to transfer the acquired data to the failure analyzing node 300. Next, the CPU 300a proceeds with the process to OP 208. In OP208, the CPU 300a transmits one of the investigation commands 300g to the node 200-1. When the node 200-1 receives the command for the failure investigation from the failure analyzing node 300, the node 200-1 performs processes to the data acquired from the memory 100-1b of the node 100-1 in OP203 according to the received command and transmits the processing result to the failure analyzing node 300. When the failure analyzing node 300 transmits an investigation command to the investigation node 200-1, the failure analyzing node 300 can start processes for failure investigation before the failure analyzing node 300 acquires a dump file of the memory 100-1b of the node 100-1. Next, the CPU 300a proceeds with the process to OP209.

In OP209, the CPU 300a performs various failure investigations to the dump file of the memory 100-1b of the node 100-1 transferred from the node 200-1. It is noted that the failure investigations performed in OP209 includes processes performed according to the investigation commands as well as conventional failure investigations performed to dump files. Therefore, the user of the failure analyzing node 300 can determine a data position or a data area as the investigation target based on the execution result of the investigation command performed by the node 200-1 in OP208 and perform appropriate failure investigations to the data position or the data area in the dump file of the memory 100-1b of the node 100-1. Next, the CPU 300a proceeds with the process to OP206.

In OP206, the CPU 300a uses a command for formatting data 300k to format the dump file of the memory 100-1b of the node 100-1 acquired in OP205 or OP207, the results of the execution of the command for the failure investigation in OP208 or the results of the failure investigation in OP209, and displays the formatted data.

Figure 7:
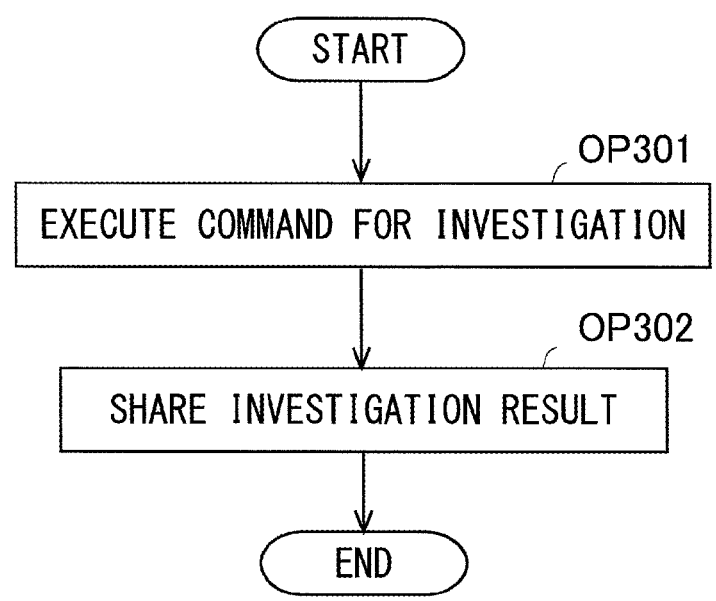
FIG. 7 is a flowchart of processes performed by an investigation agent according to an embodiment.

Next, each command executed in OP208 in the present embodiment is described with reference to FIG. 7. In OP301, the CPU300a transmits one of the investigation commands 300g to the node 200-1. In the present embodiment, the investigation commands include a command for searching a data pattern 300h, a command for tracking a pointer 300i, a command for checking a field value 300j. It is noted that each operation executed by each command corresponds to a reduction operation for determining whether a predetermined value is normal.

For example, when the CPU 300a transmits a command for searching data pattern 300h to the node 200-1, the investigation agent 200-1d of the node 200-1 searching the data of the memory 100-1b acquired from the node 100-1 for a data pattern specified by the command. And the investigation agent 200-1d holds information of the presence of the data pattern as the execution result of the command. For example, when the CPU 300a transmits a command for checking a field value 300j to the node 200-1, the investigation agent 200-1d of the node 200-1 acquires a field value at the position specified by the command in the data of the memory 100-1b of the node 100-1 and stores the acquired field value as the execution result of the command.

Figure 8A:
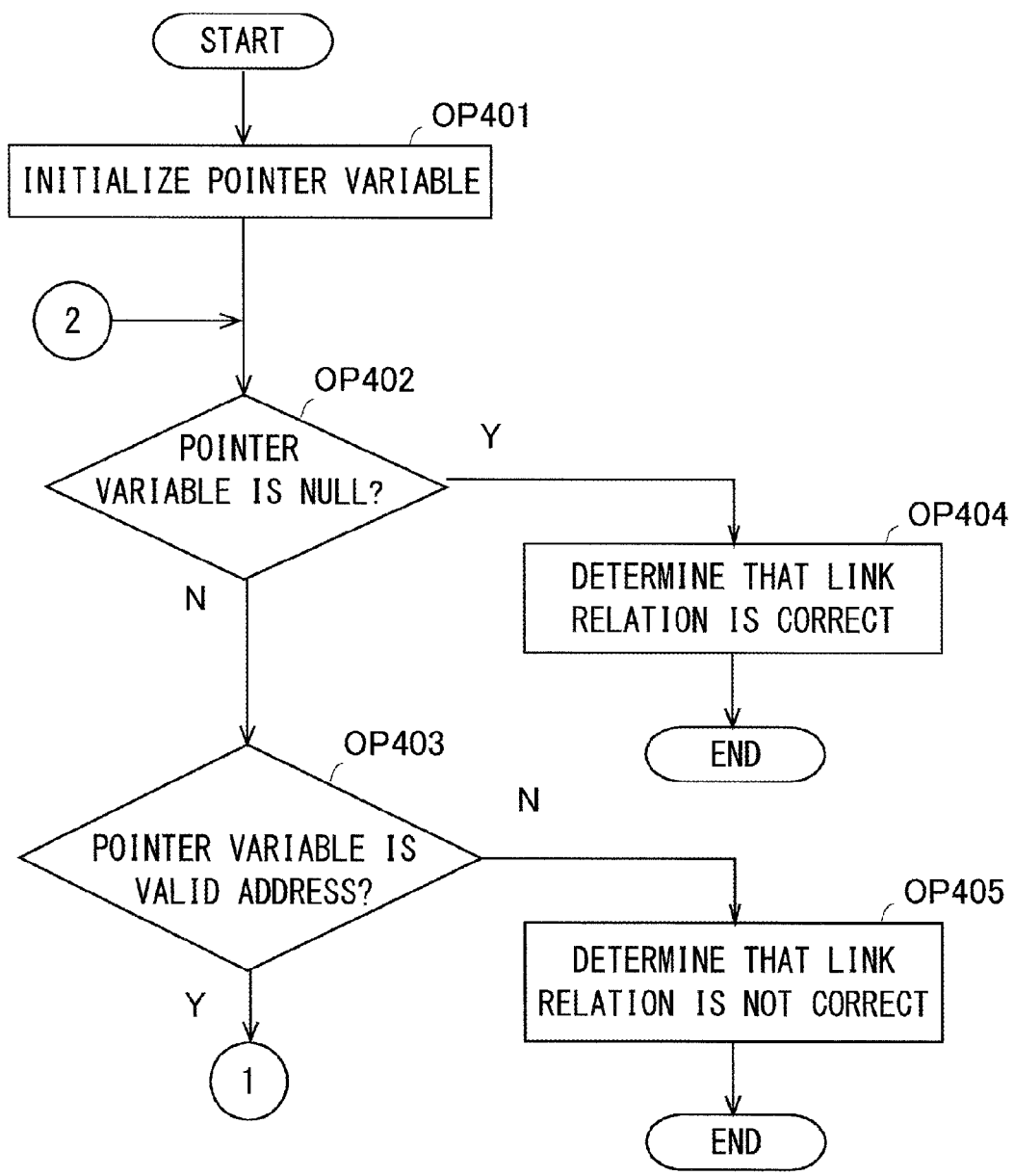
FIG. 8A is a flowchart of processes performed by an investigation agent according to an embodiment.
Figure 8B:
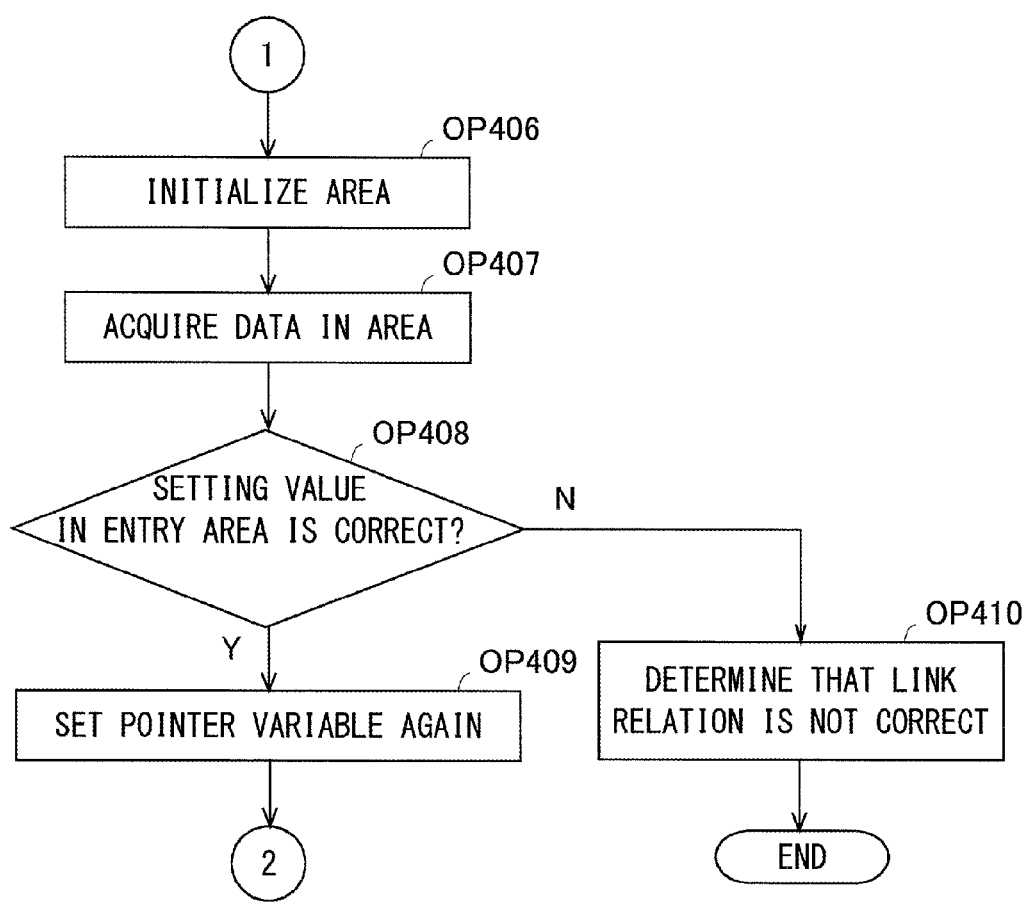
FIG. 8B is a flowchart of processes performed by an investigation agent according to an embodiment.

FIGS. 8 and 9 illustrate a flowchart of processes performed by the investigation agent 200-1d of the node 200-1 when the CPU 300a transmits a command for tracking a pointer 300i to the node 200-1. It is noted that "1" and "2" in FIG. 8 are connected to "1" and "2" in FIG. 9, respectively. In OP401, the investigation agent 200-1d initializes the pointer variable of the structure for the starting point specified by the command by using a value of the pointer area of the subsequent structure as the investigation target. As a result, the subsequent structure as the investigation target is set as the structure which the pointer of the structure as the starting point refers to. It is noted that the entity data is not acquired from the subsequent structure in OP401. Next, the CPU 300a proceeds with the process to OP402.

In OP402, the investigation agent 200-1d determines whether the initialized pointer variable is NULL. When the initialized pointer variable is NULL (OP402: Yes), this means that there is not a link destination of the structure. Therefore, the investigation agent 200-1d proceeds with the process to OP404. On the other hand, the initialized pointer variable is not NULL (OP402: No), the investigation agent 200-1d proceeds with the process to OP403. In OP404, the investigation agent 200-1d determines that there is not a link destination of the structure, that is, the pointer does not refer to an incorrect link since the pointer variable is NULL. Therefore, the investigation agent 200-1d determines that the link relation between the structures is correct. And the investigation agent 200-1d stores the determination result in the memory 200-1b and terminates the processes of the flowchart.

In OP403, the CPU 300a determines whether the variable of the pointer set as the structure is a valid address, that is, the link destination of the pointer exists. When the variable of the pointer is a valid address (OP403: Yes), the CPU 300a proceeds with the process to OP406. On the other hand, when the variable of the pointer is not a valid address (OP403: No), the CPU 300a proceeds with the process to OP405. In OP405, the investigation agent 200-1d determines that the variable of the pointer set as the structure is not a valid address, that is, the link destination of the address does not exist. Therefore, the investigation agent 200-1d determines that the link relation between the structures is not correct. And the investigation agent 200-1d stores the determination result in the memory 200-1b and terminates the processes of the flowchart.

In OP406, the investigation agent 200-1d ensures and initializes an area in the memory 200-1b to store entity data from the link destination of the pointer variable which is determined in OP403 to be a valid address. Next, the investigation agent 200-1d proceeds with the process to OP407. In OP407, the investigation agent 200-1d acquires entity data using RDMA (Remote Direct Memory Access) from the structure which is the link destination and stores the acquired entity data in the area ensured in OP406. And the investigation agent 200-1d proceeds with the process to OP408.

In OP408, the investigation agent 200-1*d* determines whether the setting value in each entry area in the entity data of the structure of the link destination acquired in OP407 is normal. For example, when an address is stored in an entry in which four-byte data should be stored, the investigation agent 200-1*d* determines that the setting value in the entry area is not normal. When the investigation agent 200-1*d* determines that the setting value in each entry area as the determination target is normal (OP408: Yes), the investigation agent 200-1*d* proceeds with the process OP409. On the other hand, when the investigation agent 200-1*d* determines that the setting value in any one of the entry areas as the determination targets is not normal (OP408: No), the investigation agent proceeds with the process OP410.

In OP410, the investigation agent 200-1*d* determines that the data of the structure of the link destination is not correct and the link relation indicated by the pointer is not correct. And the investigation agent 200-1*d* stores the determination results in the memory 200-1*b* and terminates the processes in the present flowchart.

On the other hand, in OP 409, the investigation agent 200-1*d* initializes the pointer variable of the structure which has been the subsequent structure in OP401 with the value in the pointer area of a structure further subsequent to the subsequent structure in OP401. And the investigation agent 200-1*d* returns the process to OP402. As a result, the structure as the link destination for the structure as the starting point in OP401 becomes the structure as the new starting point. And when the processes subsequent to OP402 are performed again, the link relation of the pointer of the structure subsequent to the structure as the new starting point is investigated.

In the present embodiment, the nodes 200-1, 200-*n* summarize the execution results of the commands received from the failure analyzing node 300, respectively. And the nodes 200-1, 200-*n* transmit the summarized results to the failure analyzing node 300. Two working examples are described below to illustrate configurations in which a failure investigation node transmits the summary of execution results of commands which the failure investigation node receives from the failure analyzing node 300.

WORKING EXAMPLE 1

Figure 9A:
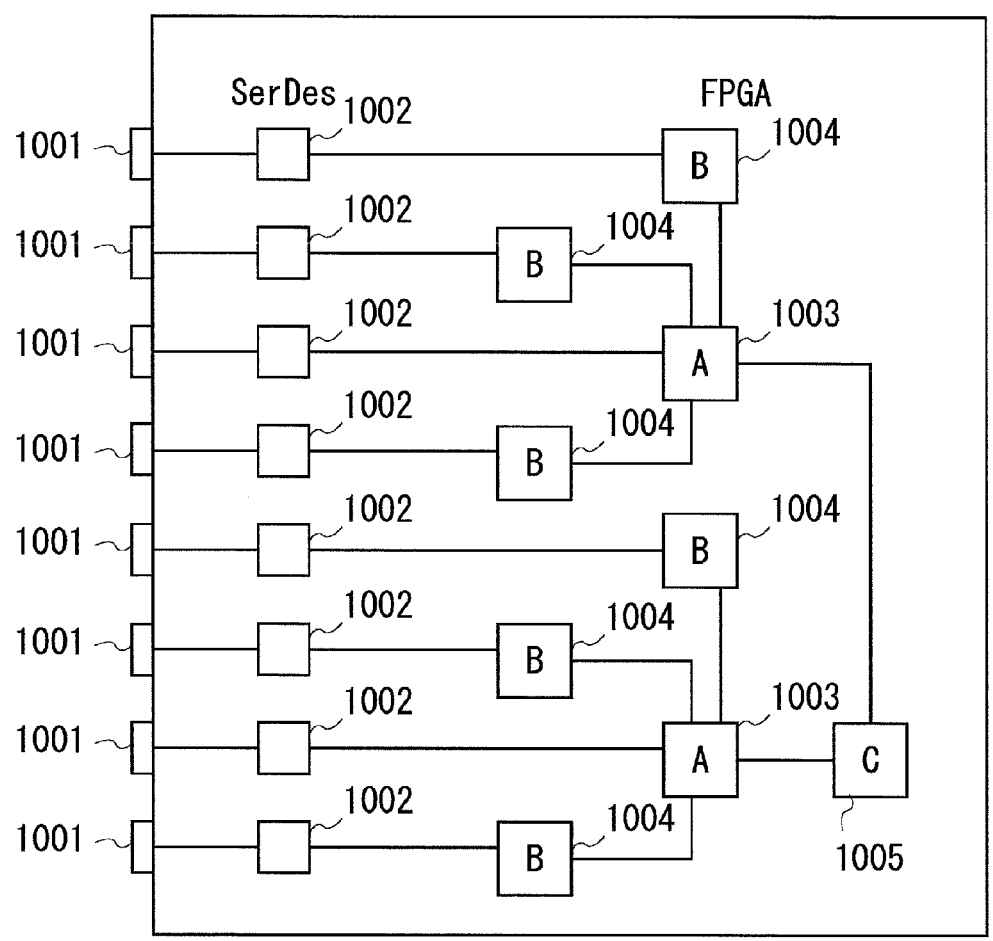
FIG. 9A is a diagram schematically illustrating a configuration of a part of a high performance switch for performing reduction operations according to an embodiment.

FIGS. 9A to 9D schematically illustrate configurations of a high performance switch 1000 for summarizing the execution results of commands executed by each node in Working Example 1. In Working Example 1, the high performance switch 100 is an apparatus which is separate from the nodes 100-1 to 100-*m*, 200-1 to 200-*n* in the parallel distributed processing system. As illustrated in FIG. 9A, a SerDes (Serializer/Deserializer) 1002 is connected with a port 1001 connected with a node in the parallel distributed processing system 1 in the high performance switch 1000. The SerDes 1002 is connected with an FPGA (Field Programmable Gate Array) A 1003 or with an FPGA B 1004.

Figure 9B:
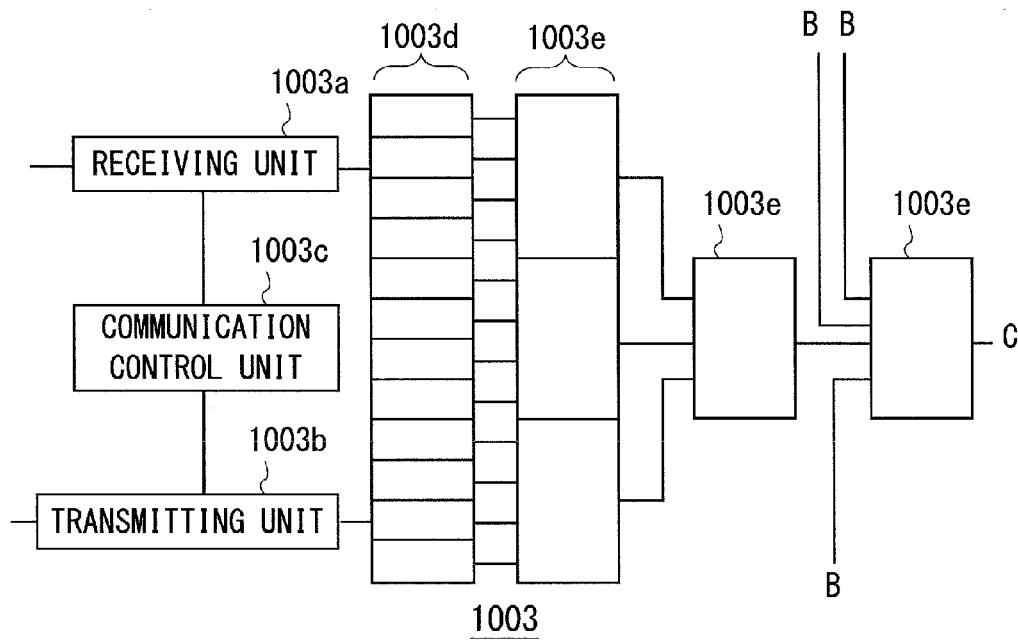
FIG. 9B is a diagram schematically illustrating a configuration of a part of a high performance switch for performing reduction operations according to an embodiment.

FIG. 9B schematically illustrates a configuration of the FPGA A 1003. As illustrated in FIG. 9B, the FPGA A 1003 includes a receiving unit 1003*a* and a transmitting unit 1003*b* for transmitting data to and receiving data from the SerDes 1002. In addition the FPGA A 1003 includes a communication control unit 1003*c* for controlling the receiving unit 1003*a* and the transmitting unit 1003*b*. Further, the FPGA A 1003 includes a plurality of communication buffers 1003*d*. Data which the FPGA A 1003 receives from each node in the parallel distributed processing system 1 is stored in a different communication buffer 1003*d*.

As illustrate in FIG. 9B, reduction operation circuits 1003*e* in the FPGA A 1003 performs two stages of reduction operation for data stored in the communication buffers 1003*d*. It is noted that the number of stages of reduction operation performed in the FPGA A 1003 is not limited to two. Next, the FPGA A 1003 uses the result of the two stages of reduction operation and results of reduction operations received from the FPGA B 1004 connected with the FPGA A 1003 to another reduction operation using another reduction operation circuit 1003*e*. And the FPGA A 1003 transmits the result of the reduction operation to the FPGA C 1005.

Figure 9C:
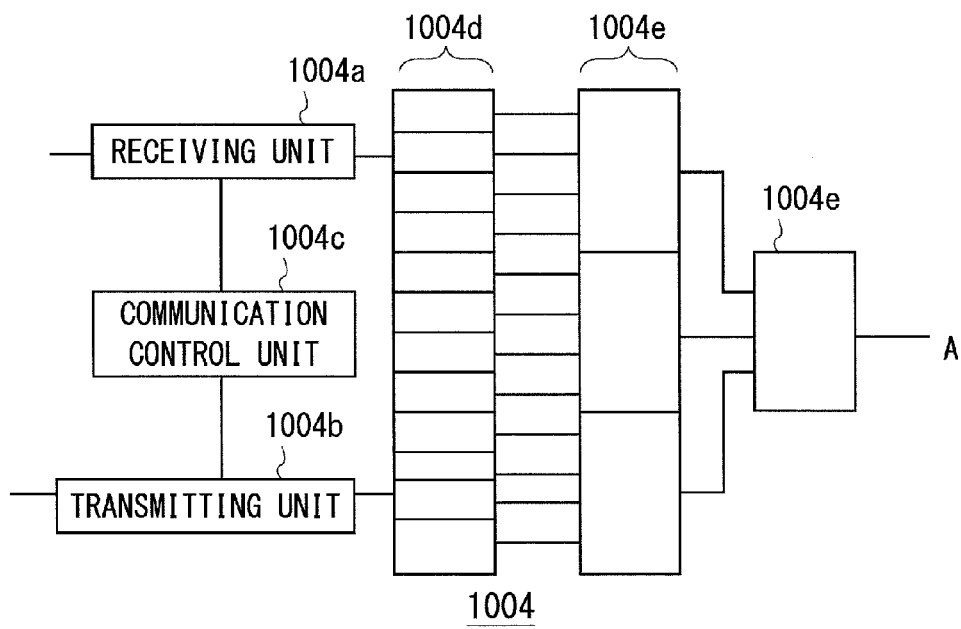
FIG. 9C is a diagram schematically illustrating a configuration of a part of a high performance switch for performing reduction operations according to an embodiment.

FIG. 9C schematically illustrates the FPGA B 1004. As illustrated in FIG. 9C, the FPGA B 1004 includes a receiving unit 1004*a* and a transmitting unit 1004*b* for transmitting data to and receiving data from the SerDes 1002. In addition the FPGA B 1004 includes a communication control unit 1004*c* for controlling the receiving unit 1004*a* and the transmitting unit 1004*b*. Further, the FPGA B 1004 includes a plurality of communication buffers 1004*d*. Data which the FPGAB 1004 receives from each node in the parallel distributed processing system 1 is stored in a different communication buffer 1004*d*. As illustrated in FIG. 9C, reduction operation circuits 1004*e* in the FPGA B 1004 performs two stages of reduction operation for data stored in the communication buffers 1004*d*. It is noted that the number of stages of reduction operation performed in FPGAB 1004 is not limited to two. Next, the FPGAB 1004 transmits the results of the reduction operations to the FPGA C 1005.

Figure 9D:
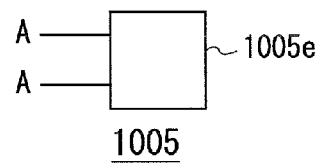
FIG. 9D is a diagram schematically illustrating a configuration of a part of a high performance switch for performing reduction operations according to an embodiment.

FIG. 9D schematically illustrates of the configuration of the FPGA C 1005. As illustrated in FIG. 9D, the reduction operation circuit in the FPGA C 1005 performs a further reduction operation to the result received from the FPGA B 1004. And the result of the further reduction operation is transmitted as the summarized result of the investigation performed by the investigation node to the failure analyzing node 300.

WORKING EXAMPLE 2

Next, the configuration of an apparatus for summarizing the execution result of a command executed by each node is described below. In Working Example 2, a NIC of each node performs the reduction operation as described above. As a result, a waiting process related to reduction operations between nodes can be achieved without processes performed by a CPU of each node.

Figure 10:
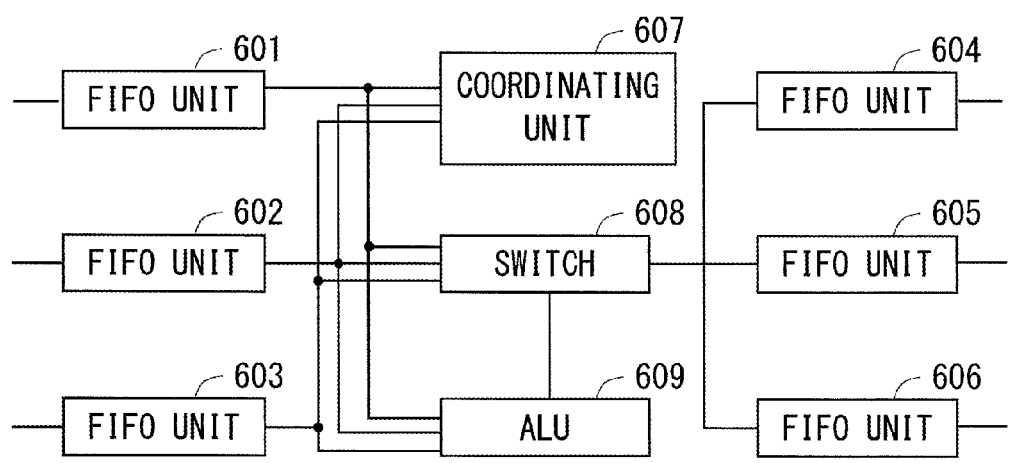
FIG. 10 is a diagram schematically illustrating a configuration of a part of an NIC for performing reduction operations according to an embodiment.

FIG. 10 illustrates a hardware configuration of apart of the NIC 100-1*c* of the node 100-1 in Working Example 2. As illustrated in FIG. 10, the NIC 100-1*c* includes FIFO (First-In First-Out) units 601 to 606, a coordinating unit 607, a switch 608, an ALU (Arithmetic Logical Unit) 609. The FIFO units 601 to 603 receive packets from ports of the NIC 1001*c* and transmit the received packets to the coordinating unit 607, the switch 608 or the ALU 609.

The ALU 609 uses packets received from the FIFO units 601 to 603 to perform reduction operations and the execution results of the reduction operations to the switch 608. The switch 608 is a crossbar switch to output packets input from the FIFO units 601 to 603 and the ALU 609 to the FIFO 604 to 606. The coordinating unit 607 coordinates the movement of packets transmitted from the FIFO units 601 to 603 to the FIFO units 604 to 606. It is noted that the FIFO units 601 to 606 represent FIFO units used in the NIC 100-1*c* in Working Example 2. Therefore, the number of FIFO units is not limited to the configuration as illustrated in FIG. 10A.

In Working Example 2, a remote NIC command execution scheme, in which there is not an issue of the increase of load accompanied with the processing of the CPU of the node 100-1, is employed. The remote NIC command execution scheme is, for example, implemented as a so-called CORE-Direct scheme in a Mellanox Infiniband apparatus. The remote NIC command execution scheme is used to reduce the load accompanied with the processing of the CPU and to perform other information processing such as calculation processing, application processing and processing which does not interfere with processes other than I/O processes.

NIC commands executed in Working Example 2 are registered in a register (not illustrated) of the NIC 100-1 etc., for example. And, the execution of commands registered in the register is controlled in the NIC 100-1*c*. Specifically, when the NIC 100-1*c* receives a command for searching a data pattern 300*h*, a command for tracking a pointer 300*i* or a command for checking a field value 300*j*, the execution of a commend in the register corresponding to the received command is initiated. The control of the execution of commands is achieved by a configuration similar to a conventional interrupt processing circuit. As a result, the NIC 100-1*c* executes an NIC command corresponding to the command received from the failure analyzing node 300 without using the CPU 100-1*a*.

The NIC command is executed by the ALC 609 of the NIC 100-1*c*. Data of the execution results of commands executed by the ALC 609 is distributed to the FIFO units 604 to 606 according to the control of the switch 608 by the coordinating unit 607. The data distributed to the FIFO units 604 to 606 is transmitted to other nodes via ports (not illustrated).

Therefore, the NIC accesses to a memory of the apparatus including the NIC without using a CPU in the apparatus to acquire data corresponding to a NIC command to be executed in Working Example 2. And the NIC performs the reduction operation for failure investigation to the acquired data. The NIC transmits the result of the reduction operation to NICs of other nodes. For example, when so-called reliable multicast all reduce communication is employed in Working Example 2, nodes including the failure analyzing node 300 in the parallel distributed processing system 1 can share the end results of reduction operations performed by the nodes. Therefore, the failure analyzing node 300 can determine a node for which the value of data as the target of the reduction operation is not valid as anode in which a failure occurs based on the end result of the reduction operation.

Although the present embodiment is described as above, the configurations and the processes of the information processing apparatus are not limited to those as described above and various variations may be made to the embodiment described herein within the technical scope of the above embodiment. For example, the node 200-1 is specified as an investigation node of the node 100-1 in the above embodiment. However, nodes other than the node 200-1 can be specified as an investigation node of the node 100-1. As a result, the failure analyzing node 300 can transmit different commands to the investigation nodes to perform different failure investigations to the node 100-1 in parallel.

<<Computer Readable Recording Medium>>

It is possible to record a program which causes a computer to implement any of the functions described above on a computer readable recording medium. In addition, by causing the computer to read in the program from the recording medium and execute it, the function thereof can be provided.

The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM (Read Only Memory).

According to one aspect, the client apparatus can avoid the interruption of the displaying of the content even when the type of content transferred to the client apparatus is changed during the streaming of the content.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus, comprising:
   a processor; and
   memory storing instructions for causing the processor to execute:
      allocating a node in an information processing system including the information processing apparatus as an investigation node configured to perform an investigation of data stored in memory of a node of which an error is detected;
      first instructing the investigation node to acquire data to be investigated from the node of which the error is detected;
      second instructing the investigation node to perform an operation for determining whether a predetermined value in the acquired data is a normal value; and
      determining that a failure occurs in the node of which the error is detected when the predetermined value is not a normal value,
   wherein when there are a plurality of nodes of which an error is detected, the allocating allocates at least one investigation node to each node of which the error is detected,
   the second instructing instructs the at least one investigation node to execute a command for determining whether the predetermined value is the normal value, to receive results of the commands from investigation nodes other than its own node, and to perform a reduction operation using the received results, and
   the determining determines that the failure occurs in the node for which a result of the reduction operation indicates that the predetermined value is not the normal value.

2. An information processing method, comprising:
   allocating, by a computer, a node in an information processing system including the information processing apparatus as an investigation node configured to perform an investigation of data stored in memory of a node of which an error is detected;
   first instructing, by the computer, the investigation node to acquire data to be investigated from the node of which the error is detected;

second instructing, by the computer, the investigation node to perform an operation for determining whether a predetermined value in the acquired data is a normal value; and determining, by the computer, that a failure occurs in the node of which the error is detected when the predetermined value is not a normal value, wherein when there are a plurality of nodes of which an error is detected, the allocating allocates at least one investigation node to each node of which the error is detected, the second instructing instructs the at least one investigation node to execute a command for determining whether the predetermined value is the normal value, to receive results of the commands from investigation nodes other than its own node, and to perform a reduction operation using the received results, and the determining determines that the failure occurs in the node for which a result of the reduction operation indicates that the predetermined value is not the normal value.

3. A non-transitory computer-readable recording medium storing a program that causes a computer to execute a process comprising:

allocating, by a computer, a node in an information processing system including the information processing apparatus as an investigation node configured to perform an investigation of data stored in memory of a node of which an error is detected;

first instructing, by the computer, the investigation node to acquire data to be investigated from the node of which the error is detected;

second instructing, by the computer, the investigation node to perform an operation for determining whether a predetermined value in the acquired data is a normal value; and determining, by the computer, that a failure occurs in the node of which the error is detected when the predetermined value is not a normal value, wherein when there are a plurality of nodes of which an error is detected, the allocating allocates at least one investigation node to each node of which the error is detected, the second instructing instructs the at least one investigation node to execute a command for determining whether the predetermined value is the normal value, to receive results of the commands from investigation nodes other than its own node, and to perform a reduction operation using the received results, and the determining determines that the failure occurs in the node for which a result of the reduction operation indicates that the predetermined value is not the normal value.

* * * * *